United States Patent [19]
Lee

[11] Patent Number: 5,660,523
[45] Date of Patent: Aug. 26, 1997

[54] TURBINE BLADE SQUEALER TIP PERIPHERAL END WALL WITH COOLING PASSAGE ARRANGEMENT

[75] Inventor: Ching-Pang Lee, Cincinnati, Ohio

[73] Assignee: General Electric Company, Cincinnati, Ohio

[21] Appl. No.: 829,641

[22] Filed: Feb. 3, 1992

[51] Int. Cl.⁶ ................................................. F01D 5/18
[52] U.S. Cl. .................... 416/97 R; 416/90 R; 415/115
[58] Field of Search .................. 416/96 RA, 97 RA, 416/90 RA; 415/115, 116

[56] References Cited

U.S. PATENT DOCUMENTS

| | | | |
|---|---|---|---|
| 3,329,596 | 7/1967 | Abt et al. | 416/97 R |
| 3,616,125 | 10/1971 | Bowling | 416/97 R |
| 3,688,833 | 9/1972 | Bykov et al. | 416/97 R |
| 3,819,295 | 6/1974 | Hauser et al. | 416/97 |
| 3,899,267 | 8/1975 | Dennis et al. | 416/92 |
| 3,934,322 | 1/1976 | Hauser et al. | 416/97 R |
| 4,142,824 | 3/1979 | Andersen | 416/97 R |
| 4,247,254 | 1/1981 | Zelahy | 416/97 R |
| 4,487,550 | 12/1984 | Horvath et al. | 416/228 |
| 4,540,339 | 9/1985 | Horvath | 416/92 |
| 4,726,104 | 2/1988 | Foster et al. | 416/97 R |
| 4,752,186 | 6/1988 | Liang | 416/97 R |
| 4,893,987 | 1/1990 | Lee et al. | 416/92 |
| 5,062,768 | 11/1991 | Marriage | 416/97 R |

FOREIGN PATENT DOCUMENTS

| | | | |
|---|---|---|---|
| 876936 | 7/1949 | Germany | 416/97 R |
| 104506 | 8/1980 | Japan | 416/97 R |
| 243324 | 5/1969 | U.S.S.R. | 416/97 R |
| 800517 | 8/1958 | United Kingdom | 416/97 R |

Primary Examiner—Michael J. Carone
Assistant Examiner—Christopher K. Montgomery
Attorney, Agent, or Firm—Andrew C. Hess; Patrick R. Scanlon

[57] ABSTRACT

A turbine blade squealer tip has a cooling passage arrangement which includes a peripheral end wall surrounding a central portion of an end cap of the squealer tip, an outer peripheral groove defined in an outer surface of the peripheral end wall being spaced outwardly from the central portion of the end cap, and a multiplicity of holes extending through the end wall from the outer groove to an internal source of cooling air flow within the turbine blade, bypassing the central portion of the end cap of the squealer tip. The outer groove which receives the flow of cooling air from outlets of the holes tends to trap the air therein so as to form an annular air seal about the outer surface of the squealer tip end wall which impedes leakage of hot gas flow past the squealer tip.

10 Claims, 2 Drawing Sheets

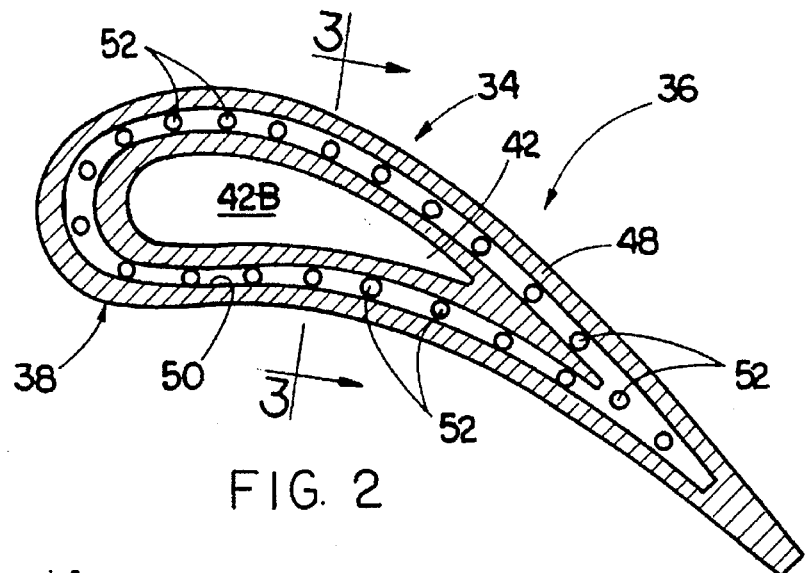
FIG. 2
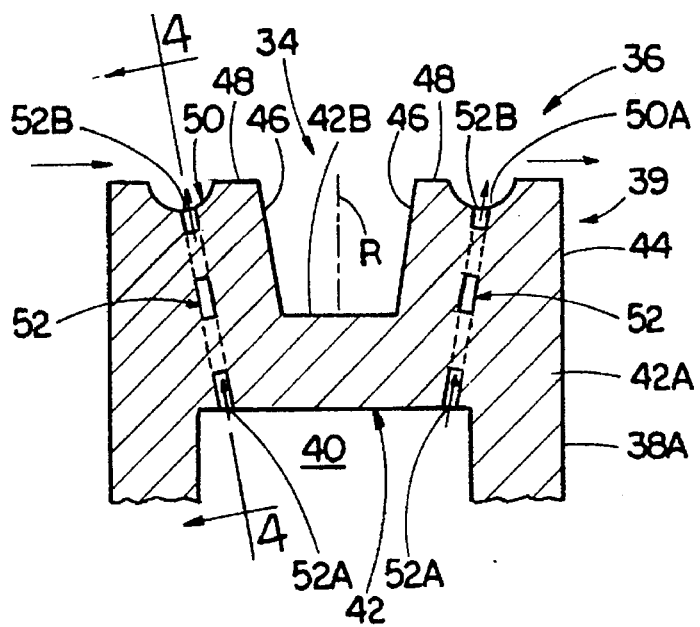
FIG. 3
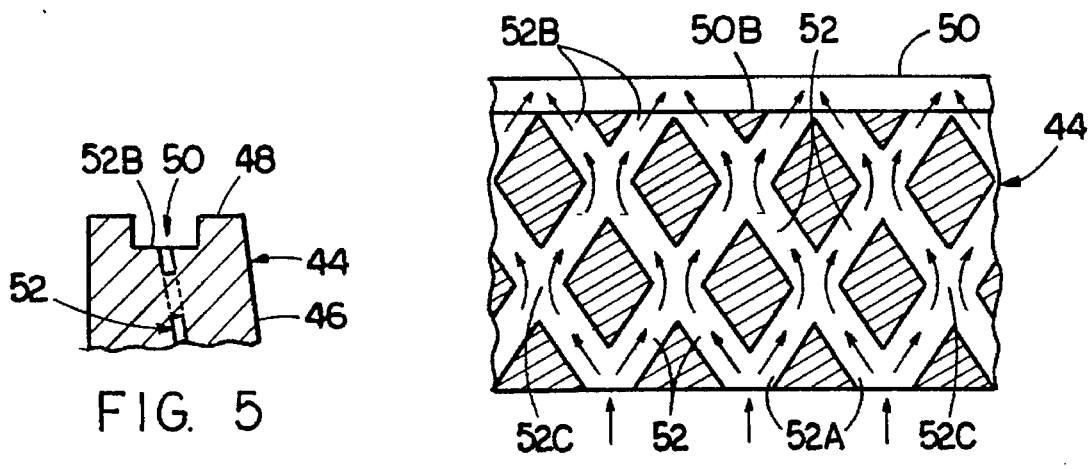
FIG. 5
FIG. 4

TURBINE BLADE SQUEALER TIP PERIPHERAL END WALL WITH COOLING PASSAGE ARRANGEMENT

CROSS REFERENCE TO RELATED APPLICATIONS

Reference is hereby made to the following U.S. patent applications dealing with related subject matter and assigned to the assignee of the present invention:

(1) "Turbine Blade Squealer Tip Having Air Cooling Holes Contiguous With Tip Interior Wall Surface" by Ching P. Lee et al, assigned U.S. Ser. No. 615,520 and filed Nov. 19, 1990 (13DV-9683), now abandoned.

(2) "Cooling Hole Arrangements In Jet Engine Components Exposed To Hot Gas Flow" by Ching P. Lee et al, assigned U.S. Ser. No. 801,136 and filed Dec. 2, 1991 (13DV-10789), now U.S. Pat. No. 5,326,224.

BACKGROUND OF THE INVENTION

1. Field of the Invention

The present invention relates generally to gas turbine engine blades and, more particularly, to a turbine blade squealer tip peripheral end wall with a cooling passage arrangement.

2. Description of the Prior Art

It is well known that a reduction in gas turbine engine efficiency results from leaking of hot expanding combustion gases in the turbine across a gap between rotating turbine blades and stationary seals or shrouds which surround them. The problem of sealing between such relatively rotating members to avoid loss in efficiency is very difficult in the turbine section of the engine because of high temperatures and centrifugal loads.

One method of improving the sealing between the turbine blade and shroud is the provision of squealer type tips on turbine blades. A squealer tip includes a continuous peripheral end wall of relatively small height surrounding and projecting outwardly from an end cap on the outer end of a turbine blade which closes a cooling air plenum in the interior of the blade.

During operation of the engine, temperature changes create differential rates of thermal expansion and contraction on the blade rotor and shroud which may result in rubbing between the blade tips and shrouds. Centrifugal forces acting on the blades and structural forces acting on the shrouds create distortions thereon which may also result in rubbing interference.

Such rubbing interference between the rotating blade tips and surrounding stationary shrouds causes heating of the blade tips resulting in excessive wear or damage to the blade tips and shrouds. It is, therefore, desirable to cool the blade tips. However, in the case of squealer type blade tips, heating produced by such rubbing interference is actually augmented by the presence of a cavity defined by the end cap and peripheral end wall of the squealer tip. Therefore, squealer type blade tips, though fostering improved sealing, actually require additional cooling.

Because of the complexity and relative high cost of replacing or repairing turbine blades, it is desirable to prolong as much as possible the life of blade tips and respective blades. Blade tip cooling is a conventional practice employed for achieving that objective. The provision of holes for directing air flow to cool blade tips is known in the prior art, for instance as disclosed in U.S. Pat. No. 4,247,254 to Zelahy, and have been applied to squealer type blade tips as disclosed in U.S. Pat. No. 4,540,339 to Horvath.

Turbine engine blade designers and engineers are constantly striving to develop more efficient ways of cooling the tips of the turbine blades to prolong turbine blade life and reduce engine operating cost. However, cooling air used to accomplish this is expensive in terms of overall fuel consumption. Thus, more effective and efficient use of available cooling air in carrying out cooling of turbine blade tips is desirable not only to prolong turbine blade life but also to improve the efficiency of the engine as well, thereby again lowering engine operating cost. Consequently, there is a continuing need for a cooling hole design that will make more effective and efficient use of available cooling air.

SUMMARY OF THE INVENTION

The present invention provides a turbine blade squealer tip peripheral end wall having a cooling passage arrangement designed to satisfy the aforementioned need. In accordance with the present invention, the cooling passage arrangement provides an outer peripheral groove in an outer surface of the squealer end wall and a multiplicity of intersecting holes extending through the end wall from the outer groove to an internal source of cooling air flow within the turbine blade. The intersecting holes provide a larger cooling surface area and thereby more effective convective cooling than do conventional separate single holes. Also, the flow intersections formed by the intersecting holes more effectively restrict the flow of cooling air from the internal cooling passage and thereby cause a more highly turbulent flow within the holes. Further, the intersecting holes are individually straight holes that can be drilled by a cost-effective laser process. The outer groove tends to trap the cooling air therein so as to form an annular air seal about the outer surface of the squealer tip end wall which impedes leakage of hot gas flow.

Accordingly, the present invention is directed to a cooling passage arrangement in a turbine blade having an interior source of cooling air flow and an outer end cap with a continuous peripheral portion. The cooling passage arrangement comprises: (a) a peripheral end wall connected to, extending around, and projecting outwardly from the peripheral portion of the end cap of the blade so as to surround a central portion of the end cap, the end wall having an outer surface spaced outwardly from the central portion of the end cap; (b) an outer groove defined in the outer surface of the peripheral end wall, the outer groove extending about at least a portion of the extent of the outer surface of the peripheral end wall; and (c) a multiplicity of holes extending through the peripheral end wall from the internal source of cooling air flow to the outer groove, the holes being arranged to intersect with one another and to bypass the central portion of the end cap of the blade.

More particularly, preferably, the outer cooling groove is continuous about the outer Surface of the peripheral end wall. Also, the multiplicity of holes includes a first plurality of generally parallel extending holes and a second plurality of generally parallel extending holes intersecting the holes of the first plurality such that each of the holes intersect with more than one other hole.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is a top plan view of a turbine blade squealer tip incorporating the cooling passage arrangement in accordance with the present invention.

FIG. 3 is an enlarged fragmentary radial sectional view of the cooling passage arrangement taken along line 3—3 of FIG. 2.

FIG. 4 is an enlarged fragmentary longitudinal sectional view of the cooling passage arrangement taken along line 4—4 of FIG. 3.

FIG. 5 is an enlarged fragmentary radial sectional view showing an alternative configuration of an outer groove of the cooling passage arrangement to the configuration shown in FIG. 3.

DETAILED DESCRIPTION OF THE INVENTION

Figure 1:
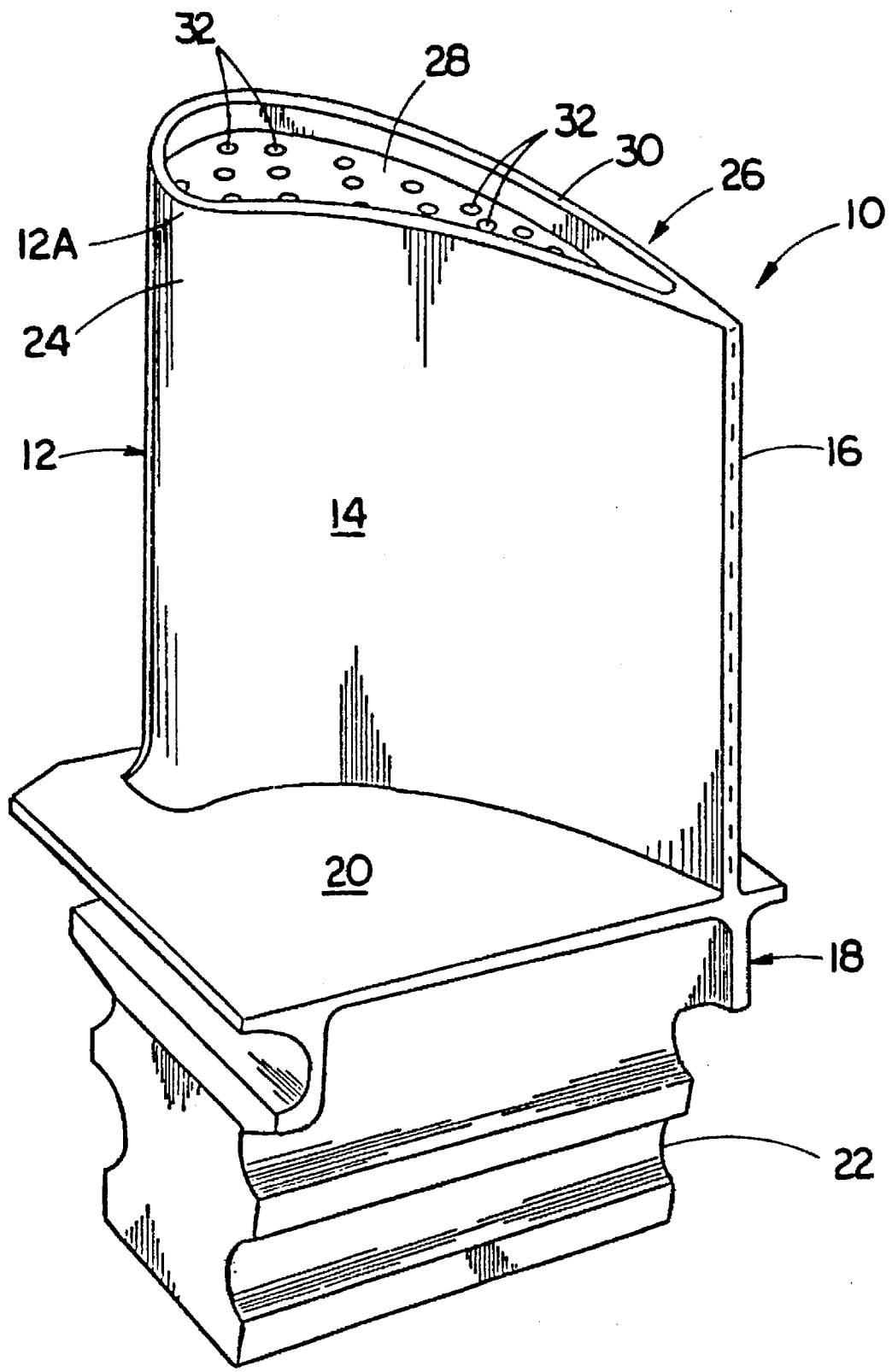
FIG. 1 is a perspective view of a prior art turbine blade having a squealer tip with cooling holes through an end cap of the blade.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Prior Art Gas Turbine Engine Blade

Referring now to the drawings, and particularly to FIG. 1, there is illustrated a prior art gas turbine engine hollow rotor blade, being generally designated by the numeral 10. The blade 10 includes an airfoil 12 having a pressure side 14 and a suction side 16, and a base 18 mounting the airfoil 12 to a rotor (not shown) of the engine (not shown). The base 18 has a platform 20 rigidly mounting the airfoil 12 and a dovetail root 22 for attaching the blade 10 to the rotor.

At an outer end portion 24, the airfoil 12 of the blade 10 has a squealer tip 26. The squealer tip 26 includes an end cap 28 which closes the outer end portion 24 of the hollow blade 10, and an end wall 30 attached to, and extending along the periphery 12A of, and projecting outwardly from, the end cap 28 so as to define a cavity therewith. The end cap 28 of the squealer tip 26 is provided with an arrangement of tip cooling holes 32 formed therethrough for permitting passage of cooling air flow from the interior of the blade 10 through the end cap 28 to the cavity defined by the end wall 30 and end cap 28 for purposes of cooling the blade squealer tip 26.

The tip of a turbine blade is designed to serve three purposes. One purpose is to maintain the blade integrity in the event of rubbing between the blade tip and a stationary shroud (not shown). The second purpose is to minimize the leakage flow across the blade tip from the pressure side to the suction side in the direction of the arrows depicted in FIG. 3. The third purpose is to cool the blade tip within the material limit. The squealer tip 26 described above is provided in an attempt to meet these three purposes. The squealer tip 26 provides the rubbing capability and also serves as a two-tooth seal to discourage the leakage flow. Tip cooling is provided through the pressure side film cooling and the convective cooling on the squealer tip surface inside of the tip cavity. Unfortunately, the film cooling near the tip surface is not efficient due to the strong secondary flow in the gas flowpath. The cooling inside the tip cavity is also diluted by the circulation of hot leakage flow inside the tip cavity. Therefore, it is important to have an improved design to achieve all three purposes of the blade tip.

Cooling Passage Arrangement of Present Invention

Turning now to FIGS. 2–4, there is illustrated a cooling passage arrangement, generally indicated by the numeral 34, which provides a means to achieve all three purposes of the blade tip. The arrangement 34 is provided in a turbine blade 36 being constructed substantially the same as the turbine blade 10 described above with reference to FIG. 1, except for the differences noted below. Thus, the turbine blade 36 has an airfoil 38 defining an interior source 40 of cooling air flow and having an outer end portion 38A. The outer end portion 38A of the airfoil 38 has a squealer tip 39 which includes an outer end cap 42 attached thereon having a continuous peripheral portion 42A.

The cooling passage arrangement 34 of the present invention includes a peripheral end wall 44 connected to, extending around, and projecting outwardly from the peripheral portion 42A of the end cap 42 of the squealer tip 39. The peripheral end wall 44 surrounds a central portion 42B of the end cap 42. The peripheral end wall 44 has an inclined interior surface 46 and a substantially horizontal outer surface 48 spaced outwardly from the central portion 42B of the end cap 42. The peripheral end wall 44 of the blade 36 is somewhat thicker than the peripheral end wall 30 of the squealer tip 26 of FIG. 1.

The cooling passage arrangement 34 also includes an outer groove 50 defined in the outer surface 48 of the peripheral end wall 44 and extending about at least a portion of the extent of the outer surface 48 of the peripheral end wall 44 preferably, the outer groove 50 is continuous and extends completely about the outer surface 48 on the peripheral end wall 44. As seen in FIG. 3, the outer groove 50 can be semi-circular in cross-section. Alternatively, the outer groove 50 can be rectangular in cross-section as shown in FIG. 5. Other cross-sectional shapes are also possible.

The cooling passage arrangement 34 further includes a multiplicity of elongated holes 52 which extend in criss-cross fashion through the peripheral end wall 44 from the internal source 40 of cooling air flow to the bottom 50A of the outer groove 50. The elongated holes 52 are arranged in the criss-cross fashion to intersect with one another and also to bypass the central portion 42B of the end cap 42 of the blade squealer tip 39. Each hole 52 intersects with more than one other hole 52. More particularly, the multiplicity of criss-crossed holes 52 includes a first plurality of generally parallel extending holes and a second plurality of generally parallel extending holes intersecting the holes of the first plurality.

Preferably, the elongated holes 52 are substantially straight and of uniform cross-sectional size. Each hole 52 has a flow inlet 52A communicating with the interior source 40 of cooling air flow of the airfoil 38, and a flow outlet 52B opening at the bottom 50A of, and communicating with, the outer groove 50 defined in the outer surface 48 of the peripheral end wall 44 of the squealer tip 39. Pairs of the holes 52 intersect at the inlets 52A thereof and are located side-by-side at the outlets 52B thereof such that the area at the outlets is larger than that at the intersections 52C. The holes 52 are disposed in an inclined relation to a radial line R through the airfoil 38 and so extend in a convergent relation with respect to one another through the peripheral end wall 44 from the outer groove 50 to the internal source 40 of cooling air flow within the turbine blade 36, bypassing the central portion 42B of the end cap 42.

The intersecting holes 52 provide a larger cooling surface area and thereby more effective convective cooling than do conventional single holes. Also, the flow intersections formed by the intersecting holes 52 more effectively restrict the flow of cooling air from the internal source 40 and thereby cause a more highly turbulent flow within the holes 52. Also, the intersecting holes 52 being individually straight holes can be drilled by a cost-effective laser process. The outer groove 50 which receives the flow of cooling air from the outlets 52B of the holes 52 tends to trap the air therein so as to form an annular air seal about the outer surface 48 of the squealer tip end wall 44 which discourages leakage of hot gas flow.

In summary, from a mechanical perspective, the above-described outer cooling groove 50 provides a four-tooth seal feature on the outer end of the peripheral end wall 44, as opposed to the two-tooth seal feature provided heretofore by the peripheral end wall alone. From an aerodynamics perspective, the outer cooling groove 50 provides an annular air seal feature. These two features when combined together reduce the tip leakage flow. The criss-crossed or meshed hole feature will allow for drilling larger holes to prevent dust plugging and still restrict the flow. The meshed hole feature also has a much larger cooling area than the conventional single holes and provides an effective convective cooling. The cooling groove and the large meshed hole features will also prevent the hole plugging in the event of tip rub. The groove can be either cast or EDM and the meshed holes can be drilled by a laser or cast. Depending upon the engine design condition, the cooling groove and meshed holes can be designed for a local region without covering the entire squealer tip 39.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

What is claimed is:

1. In a turbine blade having an interior source of cooling air flow and an outer end cap with a continuous peripheral portion, a cooling passage arrangement comprising:

(a) a peripheral end wall connected to, extending around, and projecting outwardly from said peripheral portion of said end cap of said blade so as to surround a central portion of said end cap, said peripheral end wall having an outer surface spaced outwardly from said central portion of said end cap;

(b) an outer groove defined in said outer surface of said peripheral end wall, said outer groove extending about at least a portion of the extent of said outer surface of said peripheral end wall; and (c) a multiplicity of holes extending through said peripheral end wall from said internal source of cooling air flow to said outer groove, said holes being arranged in a criss-cross fashion with respect to one another so as to intersect with one another within said peripheral end wall and to bypass said central portion of said end cap of said blade.

2. The arrangement as recited in claim 1, wherein said holes are substantially straight and of uniform cross-sectional size.

3. The arrangement as recited in claim 1, wherein said outer groove in conjunction with the flow of cooling air received from said holes defines an annular air seal about said outer surface of said peripheral end wall of said blade.

4. The arrangement as recited in claim 1, wherein each of said holes includes:

a flow inlet communicating with said interior source of cooling air flow of said blade; and a flow outlet communicating with said outer groove defined in said outer surface of said peripheral end wall of said blade.

5. The arrangement as recited in claim 4, wherein pairs of said holes intersect at said inlets thereof and are located side-by-side at said outlets thereof such that the area at said outlets is larger than that at said intersections.

6. The arrangement as recited in claim 1, wherein said outer groove is semi-circular in cross-section.

7. The arrangement as recited in claim 1, wherein said outer groove is rectangular in cross-section.

8. The arrangement as recited in claim 1, wherein said multiplicity of holes includes a first plurality of generally parallel extending holes and a second plurality of generally parallel extending holes intersecting said holes of said first plurality such that each of said holes intersect with more than one other hole.

9. The arrangement as recited in claim 1, wherein said outer groove is continuous about said outer surface of said peripheral end wall.

10. The arrangement as recited in claim 9, wherein said holes extending in a convergent relation with respect to one another through said peripheral end wall from said outer groove to said internal source of cooling air flow within said turbine blade.

* * * * *